June 4, 1935.  G. V. WOODLING  2,004,068
STABILIZER FOR VEHICLES
Filed Jan. 7, 1933    4 Sheets-Sheet 1

WITNESS.

INVENTOR.
George V. Woodling

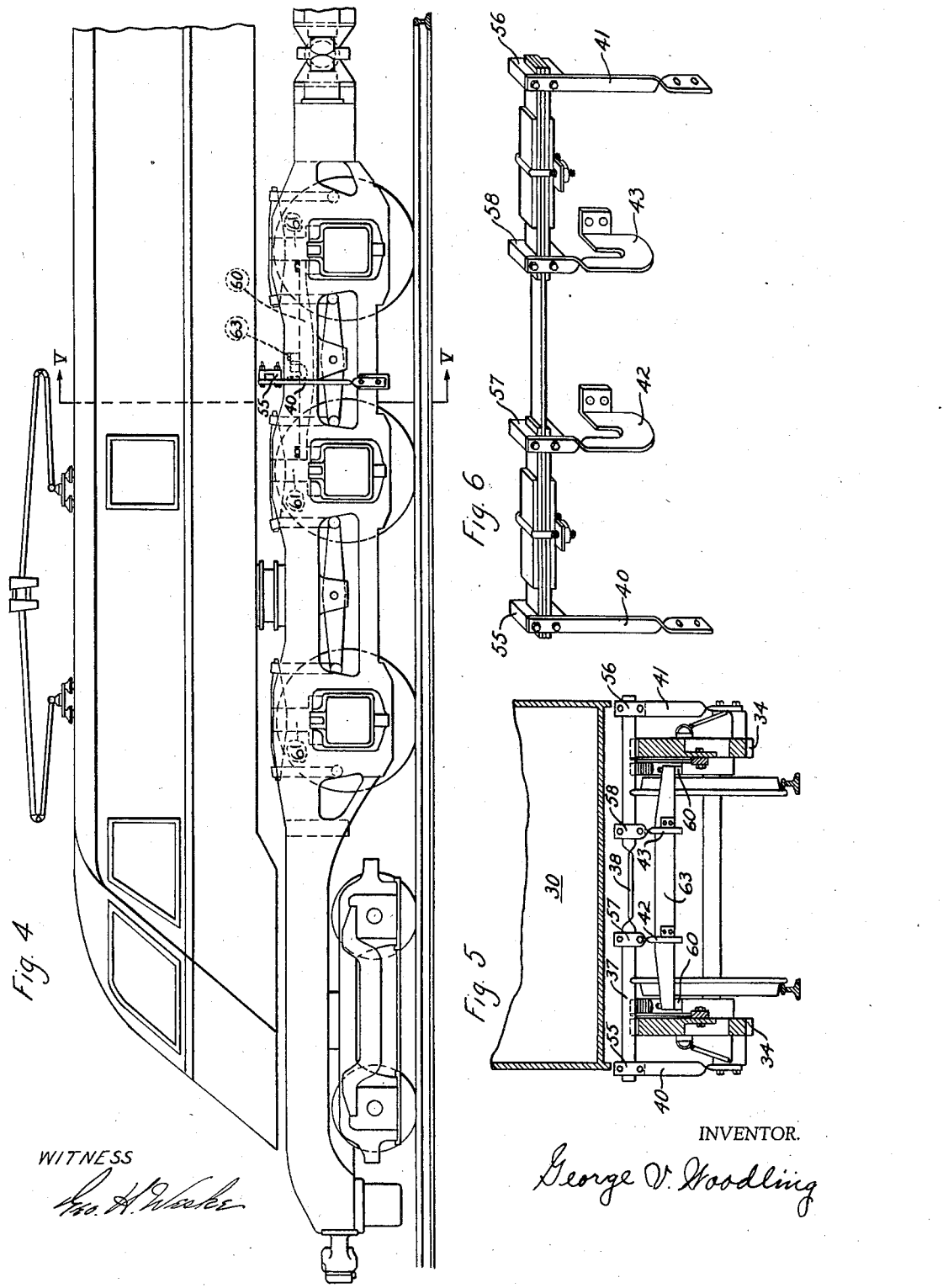

June 4, 1935.   G. V. WOODLING   2,004,068
STABILIZER FOR VEHICLES
Filed Jan. 7, 1933   4 Sheets-Sheet 3
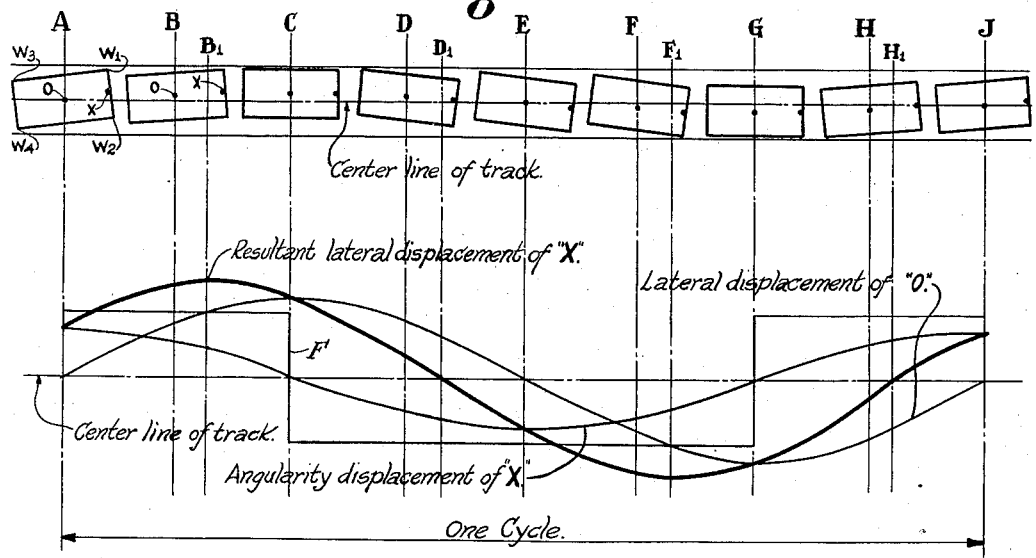
Fig. 7.
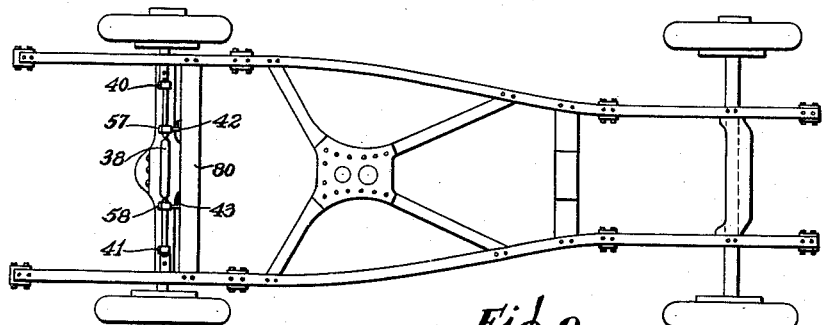
Fig. 8.
Fig. 9.
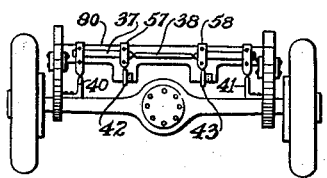
Fig. 10.
INVENTOR.
George V. Woodling June 4, 1935.　　　G. V. WOODLING　　　2,004,068

STABILIZER FOR VEHICLES

Filed Jan. 7, 1933　　　4 Sheets-Sheet 4

WITNESS.

INVENTOR.

George V. Woodling

Patented June 4, 1935

2,004,068

UNITED STATES PATENT OFFICE 2,004,068

STABILIZER FOR VEHICLES

George V. Woodling, Cleveland, Ohio

Application January 7, 1933, Serial No. 650,628

50 Claims. (Cl. 267—11)

My invention relates generally to vehicles and more particularly to means for improving the tracking characteristics of rail vehicles and the riding quality of automotive vehicles.

In the following description, my invention will be described in connection with a passenger or freight car, an electric locomotive, and an automobile, but it is to be understood that my invention applies to vehicles of all types. Also, for the purpose of clarity and simplicity, the vehicle may be considered as having two main parts; one the sprung mass and the other the unsprung mass. The sprung mass comprises that part of the vehicle which is supported by the springs, and the unsprung mass comprises the axle and wheels and any other parts that may be mounted thereon.

An object of my invention is the provision of a stabilizer mounted between the sprung and the unsprung masses to improve the operating characteristics of the vehicle.

A more specific object of my invention is to provide for arresting the "rolling" and the "nosing" actions of a rail vehicle.

Another object of my invention is the provision of a stabilizer which, when mounted between the sprung and the unsprung masses of a rail vehicle having a spring equalization system, allows the free vertical movements of the wheels.

A further object of my invention is to allow the free vertical movements of the sprung mass with respect to the unsprung mass, but, at the same time, prevent the "rolling" action.

It is also an object of my invention to reduce to a minimum the angle between the center line of a rail vehicle and the center line of the track, and thereby prevent the "nosing" action of the rail vehicle.

A still further object of my invention is to provide for giving in effect a three point suspension of the sprung mass upon the unsprung mass.

Another object of my invention is to provide for improving the riding quality of automotive vehicles.

A further object of my invention is the provision of a stabilizer that shall be reliable, free from wear, and efficient in operation, and shall be readily manufactured and installed.

Other objects and a fuller understanding of my invention may be had by referring to the following description taken in connection with the accompanying drawings, in which Figure 1 is a partial side elevational view of a rail vehicle, showing only one of the several trucks upon which my invention is embodied;

Fig. 4 is a side elevational view of the front half of an electrical locomotive embodying the features of my invention;

Fig. 5 is a cross-sectional and elevational view of the electric locomotive taken along the line V—V of Fig. 4;

Fig. 6 is a perspective view of a modified form of a stabilizing spring embodying the features of my invention;

Fig. 7 is a diagrammatic view of the sinusoidal manner in which a rail vehicle longitudinally moves along the track.

Fig. 8 is a view of curves showing the sinusoidal lateral movements of the unsprung mass of a rail vehicle moving longitudinally along the rails, the Fig. 8 being shown in the same time relation as Figure 7, the dotted vertical lines showing the corresponding positions.

Fig. 9 is a plan view of an automobile chassis showing the mounting of my stabilizer between the sprung and unsprung masses.

Fig. 10 is a rear-end view of the automobile chassis shown in Fig. 9.

Figure 1:
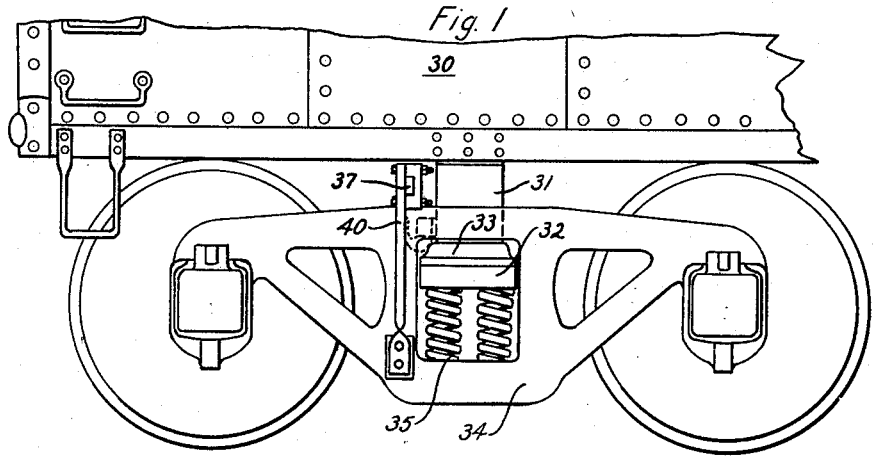
Figure 2:
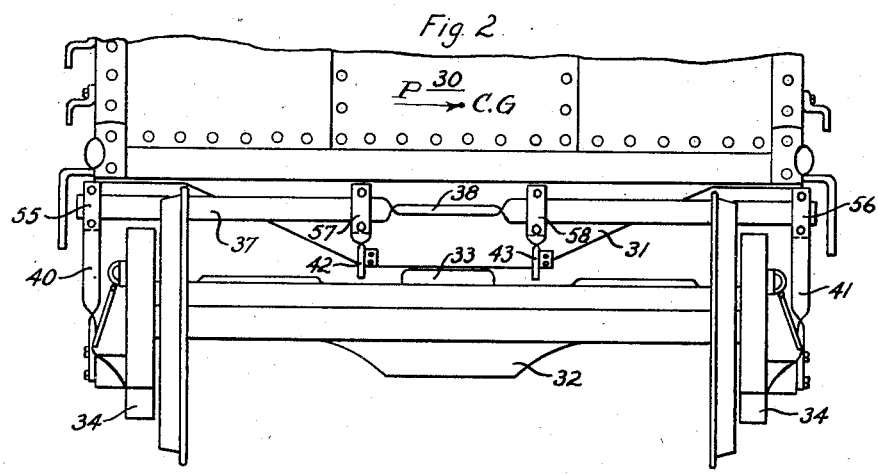
Fig. 2 is a cross-sectional and elevational end view of a rail vehicle embodying the features of my invention.
Figure 3:
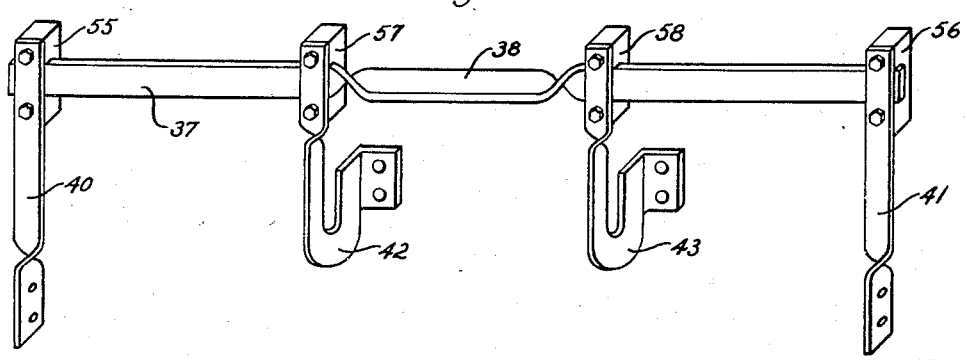
Fig. 3 is an enlarged perspective view of a stabilizing spring embodying the features of my invention.
Figure 15:
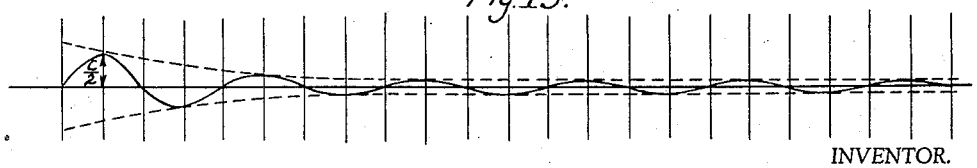

Fig. 15 illustrates the lateral oscillations of the unsprung mass of a locomotive provided with my stabilizer and running above the "critical speed", in which the amplitudes of the lateral oscillations are not totally damped but are stable at some predetermined low value, With particular reference to Figures 1 and 2 of the drawings, which show a fragmentary view of a freight or passenger car, the sprung mass comprises, in general, the body 30, the underframe 31, and the bolster 32 upon which the underframe 31 is pivotally mounted by means of a suitable king plate 33. The unsprung mass of the vehicle comprises, in general, the wheels and axle and the truck frame 34 upon which the bolster 32 is resiliently mounted by means of the coil springs 35. In accordance with my invention, a stabilizing spring 37 is mounted between the sprung and the unsprung masses of the vehicle. An enlarged perspective view of the stabilizing spring 37 is shown in Fig. 3. As illustrated, the stabilizing spring is constructed of one integrally formed flat piece having its central portion 38 twisted one-quarter of a turn. In mounting the stabilizing spring 37, the outer edge-wise ends may be connected to the side frame 34 by means of two similarly constructed flat springs 40 and 41, and the edge-wise part intermediate its ends may be connected to the underframe 31 by means of two similarly constructed spaced spring brackets 42 and 43. The upper ends of the flat springs 40 and 41 may be suitably connected to the outer edge-wise ends of the stabilizing spring 37 by means of the illustrated clamping blocks 55 and 56, and the lower ends of the flat springs 40 and 41 may be twisted one-quarter of a turn and bolted, or otherwise connected, to the side frame 34. As for the two spaced spring brackets 42 and 43, the upper ends may be suitably connected to the edge-wise part at a point near the twisted central portion 38 by means of the illustrated clamping blocks 57 and 58, and the other ends of the spaced spring brackets may be curved upwardly in the same plane and bolted, or otherwise suitably connected, to the underframe 31. In order to avoid slippage and wear of the connected parts, all of the clamping blocks firmly and securely engage the stabilizing spring 37.

As is noted, the flexure of the flat springs 40 and 41 takes care of the lateral clearances of the sprung and the unsprung masses, as well as allows the truck to turn with respect to the body when going around curves and the like. Similarly, the lateral flexure of the two spaced spring brackets 42 and 43 allows the two clamping blocks 57 and 58 to swing laterally, with the result that the central twisted portion 38 of the stabilizing spring 37 may freely deflect up and down. Consequently, by virtue of the flexure of the spring members the entire mounting is free of wearing parts. This feature is very important for the reason that, in ordinary freight service, the cars are not returned for repairs, unless they are damaged due to a wreck, for a period of two or three years.

In explaining the operation of my invention, let it first be assumed that the relative movements between the sprung and the unsprung masses of the vehicle are vertically up and down. Under this condition, the two clamping blocks 57 and 58 move vertically up and down with reference to the axle. This action merely causes the twisted central portion 38 of the stabilizing spring 37 to deflect up and down, with the result that the stabilizing spring offers no resistance to the vertical movements of the sprung and the unsprung masses of the rail vehicle. However, let it be assumed that the sprung mass tends to "roll" or turn in a clockwise direction. Under this condition the clamping block 57 moves up and the clamping block 58 moves down. As is readily apparent, the upward movement of the clamping block 57 tends to deflect the central twisted portion 38 of the stabilizing spring up, and, at the same time, the downward movement of the clamping block 58 tends to deflect the central twisted portion 38 of the stabilizing spring down. Hence, the two opposing forces set up in the central twisted portion 38 causes the entire stabilizing spring to become stiff and rigid, thus causing the stabilizing spring, by reason of its stiffness, to rigidly connect the body 30 to the side frames 34, with the result that the "rolling" action of the sprung mass with reference to the unsprung mass is arrested. The same, but reversed action, takes place when the sprung mass of the vehicle tends to "roll" or turn in a counter-clockwise direction.

Explaining further, my stabilizer functions to constrain the body 30 to move vertically up and down in a plane parallel to the axles of the truck to which the stabilizer is connected. This means that the floor of the body of the vehicle is not allowed to oscillate or "roll" relative to the plane of travel of the axle, as it does on existing rail vehicles in the absence of my stabilizer, but, on the contrary, is forced to move or travel in a plane that is substantially parallel to the plane of travel of the axle, that is to the plane of the rails at the point where the wheels are contacting. For this reason, it is preferable to have only one of the trucks connected to the body of the vehicle by my stabilizer. If two or more trucks were connected to the body of the vehicle by my stabilizer, assuming, however, that the action of my stabilizer is perfectly rigid, all of the wheels of the vehicle would be rigidly held in a plane parallel to the floor of the body, and in the case of uneven track, the wheels would not be free to move vertically up and down and follow the unevenness of the rails. When two or more trucks are connected to the body of the vehicle by my stabilizers, the stabilizers are designed to give a certain amount of flexure which allows the wheels to move vertically up and down and follow the unevenness of the rails. However, by connecting only one of the trucks to the body of the vehicle by my stabilizer, all of the wheels are free to move vertically up and down and follow the unevenness of the rails. In actual practice, the effect of my stabilizer is to change the four point suspension of the body upon the trucks to a three point suspension. That is to say, the floor of the body of the vehicle is forced to move or travel in accordance with the truck to which my stabilizer is connected. This restraining action produces an effect that is comparable to the action of the two point suspension of the rear end of a three-wheeled vehicle, and the other end of the floor of the body at the point where it is connected to the truck having no stabilizer is merely raised up and down, because the travel of the plane of the body is determined by the truck to which my stabilizer is connected. This up and down movement of the body at the point where it is connected to the truck having no stabilizer is comparable to the one point suspension of the front end of a three-wheeled vehicle. This three point suspension effect improves the tracking characteristic of rail vehicles and thus minimizes the lateral force upon the rails.

Besides improving the tracking characteristics, my stabilizer reduces the damage done to live stock, prepared meats, fruit and other goods in transit. Usually, in the transportation of prepared meats, a shoulder or other bulk is hung or suspended on hooks from the roof of the car, and, when once the car begins to "roll", the undamped action grows to large and dangerous proportions, even to the extent that in some cases a majority of the meat is thrown from the hooks to the floor.

The degree of stiffness or rigidity of the stabilizing spring 37 may be varied to accommodate vehicles of various capacities by changing the dimensions of the stabilizing spring 37 and the distance between the two spaced clamping blocks 57 and 58.

In addition to my stabilizer arresting the "rolling" action of the sprung mass relative to the unsprung mass, it provides a second function, in that it keeps the truck from needlessly turning under the body. In other words, the angle between the center line of the rail vehicle and the center line of the track is reduced to a minimum. Consequently, there is no tendency for the wheels to run laterally from one side of the track to the other. This second stabilizing feature results from the fact that the flexure of the outer edge-wise ends of the stabilizing spring 37 and the upper ends of the flat springs 40 and 41 tends to keep the wheels in alignment with the track. While my stabilizer tends to keep the truck stabilized under the body, still the action is such that it offers no material interference or resistance to the turning of the truck under the body when going around curves.

Summarizing, it is noted from the foregoing that my stabilizer allows the sprung and the unsprung masses to move vertically up and down, but resists any movement that tends to cause the sprung mass to "roll" with reference to the unsprung mass, and, in addition, tends to stabilize the truck from needlessly running from one side of the rails to the other.

In considering the tracking characteristics of a rail vehicle, let us assume first that the rail vehicle is moving along a straight and level track in an undeviated path. If some transient disturbance, such, for example, as a crooked place in the track, causes the center line of the rail vehicle to assume an angular position relative to the center line of the track, the rail vehicle will travel in the direction of its own center line. The angular position of the center line of the rail vehicle relative to the center line of the track, together with the forward (or backward) longitudinal movement of the rail vehicle, causes the rail vehicle to run across the track until the flanges of the leading wheels strike the rail. The impact of the flanges striking the rail turns the rail vehicle and thus causes the rail vehicle to run back to the other side of the track. This lateral motion of the wheels running from one side across to the other is called "nosing" of the unsprung mass of a rail vehicle.

This "nosing" action comprises essentially two main movements: 1. A rotational movement about a vertical or polar axis through some point in the center line of a rail vehicle, thus causing the center line of the rail vehicle to assume a variable angle with respect to the center line of the track; and 2. A lateral movement of the polar axis about which the rotation takes place, being caused by the rail vehicle moving forwardly or backwardly with its center line at a variable angle relative to the center line of the track.

Therefore, from the foregoing it is observed that if the center line of the rail vehicle is not allowed to assume an angular position with respect to the center line of the track, the undesirable "nosing" action cannot exist. As heretofore pointed out, my stabilizer functions to prevent the center line of the rail vehicle from assuming an angular position relative to the center line of the track.

The "nosing" action may best be understood by referring to Figs. 7 and 8, which are illustrative of the path taken by a rail vehicle in describing a substantially sinusoidal path in a cycle of longitudinal motion.

In position "A" the rail vehicle is shown having reached its maximum angularity about the polar axis "0". In this position the displacement of the point "X" caused by the angularity is maximum. The point "X" would normally lie on the center line of the track if there were no displacement caused by the "nosing" action. It is to be noted that the wheels "W₁", "W₂", "W₃" and "W₄" designated by the four corners of the rectangularly illustrated vehicle have the same general movement as the point "X", the wheels "W₃" and "W₄", of course, being negative with respect to the center line of the track as compared with the wheels "W₁" and "W₂" which are positioned positively with respect to the center line of the track. The flange of the wheel "W₁" in the position "A" does not touch the rail as there has been only a rotational movement about the polar axis "0". The lateral displacement of the polar axis "0" at this position is zero.

The vehicle proceeds to position "B". During this interval of time the angularity about the polar axis "0" decreases slightly, but the polar axis "0" does itself depart from the center line of the track because of the tendency of the vehicle to travel laterally in the direction of its own center line. The resultant displacement of the point "X" in position "B" has increased even though the angularity about the polar axis "0" has slightly decreased because the lateral displacement of "0" was more than the decrease in the angularity displacement of "X". This is shown clearly by the curves of Fig. 8 wherein it is noted that the resultant lateral displacement of "X" is greater at position "B" than at position "A". The flange of the wheel "W₁" in position "B" is on the verge of striking the rail but will not do so until the polar axis "0" of the vehicle reaches the line "B₁", at which point the resultant lateral displacement of "X" is a maximum. See Fig. 8.

Proceeding to position "C" the flange of the wheel "W₁" having struck the rail, the vehicle straightens out and assumes a position such that its center line lies parallel to the center line of the track, making the angularity about the polar axis "0" zero. The lateral displacement of the polar axis "0" is at its maximum, (see Fig. 8) but it is to be noted that the wheels "W₁" and "W₃" do not bear against the rail, there being a small clearance. At this position the resultant lateral displacement curve for "X" coincides with the lateral displacement curve for "0".

In the position "D" the rail vehicle has deflected from its previous parallel position as at "C" and assumes a slightly negative angle with respect to the center line of the track. During the interval between positions "C" and "D" the lateral displacement of the polar axis "0" decreases resulting from the longitudinal motion of the vehicle and from its tendency to travel in the direction of its own center line. The resultant displacement of the point "X" or the wheels "W₁" and "W₂" is almost zero, reaching zero, however, when the polar axis "0" of the vehicle reaches the line "D₁", where the positive amplitude of the lateral displacement of "0" just equals the negative amplitude of the angularity displacement of "X". See Fig. 8.

In position "E" the polar axis "0" lies on the center line of the track while the angularity about the polar axis has reached its maximum negative value. The resulting lateral displacement of the wheels "W₁" and "W₂" is at a value equal to that of the angularity displacement of "X" alone.

In approaching position "F" the angularity about the polar axis decreases while the polar axis itself moves in a negative direction with respect to the center line of the track. In position "F" the flange of the wheel "W₂" is almost ready to strike the rail, but will not do so until the polar axis "0" of the vehicles reaches the line "F₁".

In position "G" the vehicle assumes a parallel position with respect to the track, being similar to the position "C" except that the vehicle has proceeded laterally to the opposite side of the track and its center line in a negative position with respect to the center line of the track.

In position "H" the vehicle assumes a position similar to that of the position "D" except that the displacement values are just the opposite. The resultant displacement of the point "X" or the wheels "W₁" and "W₂" in position "H" is almost zero, reaching zero, however, when the polar axis "0" of the vehicle reaches the line "H₁". See Fig. 8.

The cycle is completed in position "J" where the vehicle is in an analogous position to that of position "A".

From the curves of Fig. 8 it may be seen that the angularity displacement of "X" or the lateral motion of the wheels resulting from the rotation about the polar axis "0" is 90° out of phase with the lateral displacement of "0" resulting from the lateral motion of the center of rotation.

As the vehicle proceeds longitudinally along the track this cycle is indefinitely repeated. Therefore, to describe the lateral motion of any point on the center line of the rail vehicle the motion resulting from the rotation of the angularity must be added vectorially to the lateral displacement of the polar axis "0". It should be noted with reference to Fig. 8 that the amplitudes of the curves are not a measure of the magnitude of the lateral and angular displacements but only show direction.

Inasmuch as the weight of the sprung mass is much heavier than the unsprung mass of a rail vehicle and, inasmuch as the stiffness of the rails is large compared to the stiffness of the springs that support the sprung mass on the rail vehicle the natural frequency of the rail vehicle is determined primarily by the combination of the sprung mass and the elasticity of the springs that support the sprung mass. Therefore, the frequency of the rail vehicle is substantially independent of the speed, which means that the angularity about the polar axis "0" varies inversely as the speed. In other words, as the speed of the vehicle increases the angularity about the polar axis decreases. Therefore, for very high speeds the resultant lateral displacement of "X" consists mostly of lateral displacement with very little angularity displacement.

The frictional force F, see Fig. 8, which causes the phenomena of "nosing" is the frictional force between the treads of the wheels and the rails which cause the rail vehicle to travel in the direction of its own center line rather than in the direction of the center line of the track. The maximum value of the disturbing force is the weight of the vehicle times the coefficient of friction between the treads of the wheels and the rails. The existence of this disturbing force is determined by the motion itself. Therefore, the frequency of the disturbing force and the motion are always equal. In other words, if there is some natural frequency at which the rail vehicle tends to oscillate the natural frequency of the disturbing force will always be in resonance.

As hereinbefore discussed, by reason of the angularity between the center line of the rail vehicle and the center line of the track, the wheels run from one rail towards the other and back again. The lateral oscillations of the unsprung mass causes a corresponding lateral oscillation to be imparted to the sprung mass of the rail vehicle. However, by virtue of the springs that support the sprung mass the lateral oscillations of the sprung mass take the form of a "rolling" action. That is to say, the sprung mass is displaced laterally while at the same time the springs on one side of the rail vehicle are expanded upwardly and the springs on the other side of the rail vehicle are deflected downwardly. The total inertia force P caused by the lateral accelerations of the sprung mass may be considered as applied at the center of gravity, see Figure 2. The inertia force P applied at the center of gravity may be replaced by a lateral force P' of equal magnitude applied at the axle or journal boxes and two equal and opposite vertical forces applied at the coil supporting springs 35 of the rail vehicle. It is noted that the two equal and opposite vertical forces tend to rotate the sprung mass about the center of gravity. This rotational motion may be characterized as a "rolling" action. The lateral force P' is in phase with the lateral velocity of the unsprung mass and hence increases the lateral motion of the unsprung mass. Then an increase of this motion causes a corresponding increase in the frictional disturbing force F which in turn causes an increase in the "rolling" action of the sprung mass and the accompanying increase in the inertia force P. This circuitous oscillatory action unless impeded by a resisting force continues to build up to dangerous proportions which in cases of high speeds becomes great enough to cause a lateral force P' to spread the rails and thus cause derailments and wrecks.

From the foregoing discussion it is noted that the phenomenon of "nosing" may be characterized as "self-induced" vibrations; that is to say, the disturbing force F furnishing the energy to the vibrations is controlled by the motion itself, in contradistinction to "forced" vibrations where the disturbing force is independent of the motion.

Since there is motion set up in the elastic system of a rail vehicle there must be an energy input causing such motion. The energy input is dependent upon the wheel loading, the number of axles, the co-efficient of friction between the wheels and track, the clearance, the frequency, the length of the vehicle, and the speed. The energy losses which tend to minimize the "nosing" action are mostly caused by the angularity displacement or the transverse sliding of the wheels upon the rails as the rail vehicle oscillates about its polar axis. The weight of the vehicle, the co-efficient of friction between the wheels of the track, the clearance, the frequency, the length of the rail vehicle and the speed are also functions of the energy losses in the elastic system of a rail vehicle. The point where the energy input equals the energy losses is the "critical" speed of the rail vehicle. For speeds below the "critical" speed, the frictional losses of the unsprung mass of the rail vehicle is greater than the energy input of the unsprung mass of the rail vehicle. Consequently, for speeds below the "critical" speed, any lateral oscillations of the unsprung mass that start are quickly damped out. For speeds above the "critical" speed the reverse condition is true, and thus energy is available to sustain the lateral oscillations of the unsprung mass of the rail vehicle.

However, by mounting my stabilizer between the sprung mass and the unsprung mass of the rail vehicle there is substantially no energy available to sustain the oscillation of the unsprung mass of the rail vehicle for the reason that the magnitude of the lateral force P applied at the center of gravity of the sprung mass is reduced to a very low value. The reduction of the magnitude of the lateral force P causes a corresponding reduction in the lateral force P' applied to the axles or the journal boxes of the unsprung mass, with the result that the angularity between the center line of the rail vehicle and the center line of the track is under all speeds of the rail vehicle reduced substantially to zero. Therefore, in view of the fact that the angularity is reduced substantially to zero my stabilizer prevents the "nosing" action and the "rolling" action of the rail vehicle for all speeds.

In Figs. 11 to 15, inclusive, I illustrate the lateral oscillations of the unsprung mass of a rail vehicle with and without my stabilizer. In all of these cases, the track is presumed to be straight and the magnitudes $$\frac{C}{2}$$

of the first lateral oscillation are the same.

Figure 11:
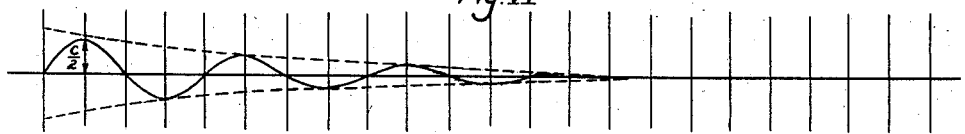
Fig. 11 illustrates the damped lateral oscillations of the unsprung mass of a rail vehicle without my stabilizer and with the rail vehicle running below its "critical speed"

Fig. 11 represents the lateral oscillations of the unsprung mass of a rail vehicle without my stabilizer and with the rail vehicle running below its "critical speed". This lateral oscillation becomes damped, for the reason that the frictional losses of the unsprung mass of the rail vehicle are greater than the energy input of the unsprung mass.

Figure 12:
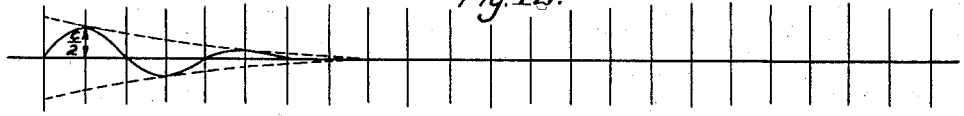
Fig. 12 represents the damped lateral oscillations of the unsprung mass of a rail vehicle provided with my stabilizer and running below the "critical speed"

Fig. 12 represents the same condition as Fig. 11, except that the rail vehicle is provided with my stabilizer. In this case, the lateral oscillations are damped somewhat quicker, since my stabilizer adds to the damping action caused by the frictional losses of the unsprung mass of the rail vehicle.

Figure 13:
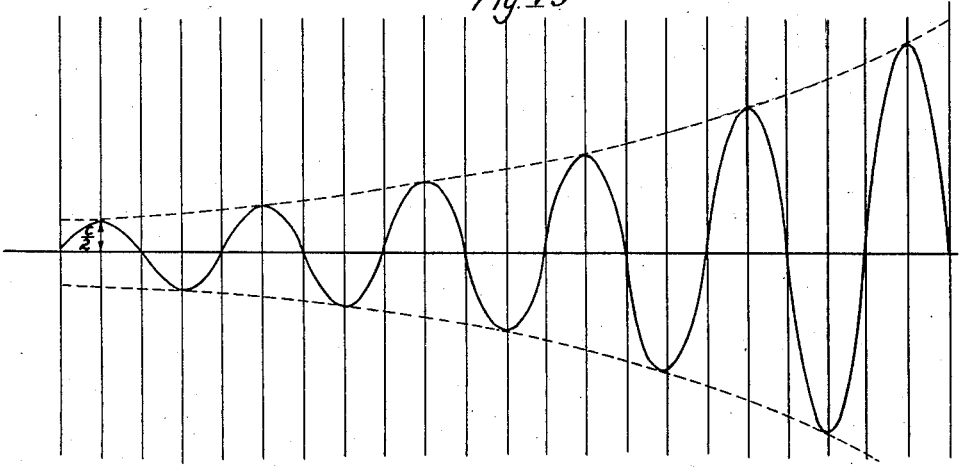
Fig. 13 illustrates the undamped and sustained lateral oscillations of the unsprung mass of a rail vehicle without my stabilizer and with the rail vehicle running above the "critical speed"

The lateral oscillation represented by the curve in Fig. 13 is for a rail vehicle provided with no stabilizer and with the rail vehicle running above the "critical speed". In this case, energy is available to sustain the lateral oscillation of the unsprung mass, and as a result the amplitude builds up to large proportions, thus causing correspondingly large lateral forces on the rails.

Figure 14:
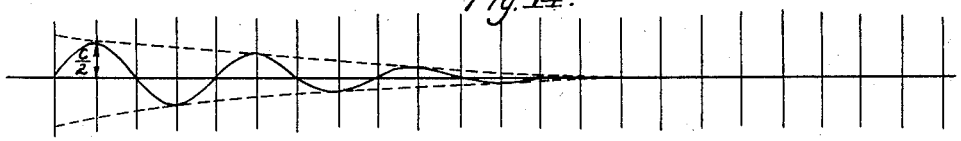
Fig. 14 illustrates the damped lateral oscillations of the unsprung mass of a rail vehicle provided with my stabilizer and running above the "critical speed"

Fig. 14 represents the same condition as Fig. 13, except that the rail vehicle is provided with my stabilizer. In illustrating this case, I have assumed that the arresting action of my stabilizer is sufficiently large to totally damp the lateral oscillations of the unsprung mass of the rail vehicle.

Fig. 15 represents the same condition as Fig. 14, except in illustrating this figure I have assumed that the arresting force of my stabilizer is not quite sufficiently large to totally damp out the lateral oscillations of the unsprung mass of the rail vehicle. In this case, the amplitude of the lateral oscillations is readily damped down to a low value, at which point the oscillations become stable.

Summarizing, it is noted that there are two disturbing factors which cause a rail vehicle to "nose"; one the rolling of the sprung mass with respect to the unsprung mass, and second the angle that exists between the center line of the rail vehicle and the center line of the track. As hereinbefore pointed out, the action of my stabilizer is twofold, in that it reduces the value of both of these disturbing factors to a minimum.

In Figs. 4 and 5, I show how my stabilizer may be mounted between the main frame (sprung mass) and the journal boxes (unsprung mass) of an electric locomotive having a spring equalization system. Briefly, the purpose of the spring equalization system is, in the case of an even track, to distribute equally the weight of the sprung mass upon the wheels, and thereby ensure substantially uniform traction between each driving wheel and the rails. As will appear later in the description, the action of my stabilizer is such that it does not materially interfere with the spring equalization system.

In the following description of my stabilizer respecting the electric locomotive, like parts of my invention are designated by the same reference characters as those used in connection with the freight or passenger car of Figs. 1 and 2.

For this showing of my invention, I preferably connect my stabilizer between the main frame and the journal boxes of the two rearward axles of the front half of the electric locomotive. To this end, the two spaced springs 42 and 43 are connected to a cross member 63 having its ends supported by two longitudinal supporting members 60 that interconnect the pedestals 61 which rest upon journal boxes of the two rearward axles. Substantially centrally positioned between the journal boxes of the two rearward axles, the ends of the cross member 63 are suitably connected to the longitudinal supporting members 60. In the foregoing mounting, my stabilizer is in no way connected to the body 30, and, as a result, the locomotive may turn around sharp curves and bends. By reason of this type of mounting, my stabilizer may with equal propriety be applied to street cars, where it is necessary for them to go around sharp street corners. Also, by a similar mounting, my stabilizer may be mounted between the journal bearings and the main frame of a steam locomotive. For simplicity and clarity, the electric motors and the gearing interconnecting the motors and the axles, are not shown.

The operation of my stabilizer in connection with the electric locomotive is the same as that explained in connection with the freight or passenger car of Figs. 1 and 2. Briefly, the main frame and in turn the body is forced by means of my stabilizer to move vertically up and down with respect to the plane of the rails at the place where the four rearward wheels contact the rails. This action, however, does not in any material manner interfere with the spring equalization system, because, in all cases regardless of the unevenness of the tracks, the four rearward wheels of the front half of the locomotive are allowed to move up and down and follow the unevenness of the rails.

As the four rearward wheels of the front half of the locomotive follow the unevenness of the rails, they, in turn, through my stabilizer, cause the main frame and the body to travel in a plane that is substantially parallel to the average plane of travel of the four rearward wheels.

The single stabilizing connection, as shown in Figs. 4 and 5, takes care of the entire locomotive, and, accordingly, the forward wheels of the front half of the locomotive and all of the wheels of the rear half of the locomotive function, in all respects, as they function on existing rail vehicles in the absence of my invention.

Therefore, by utilizing the provision of my invention to arrest the rolling action of the sprung mass of a locomotive, the possibility of the rails spreading, and thus causing injury to passengers and damage to the rolling stock, is totally avoided, even at speeds greatly in excess of 100 miles an hour or more. Another beneficial result is that the maintenance of the rails and the road bed is materially reduced. When high speed locomotives are allowed to exert high lateral forces on the rails resulting from an undamped "nosing" action, the rails, after they are used a short period, become warped, which in turn causes the "nosing" action to become worse. This action is cumulative and in some cases the track, if not properly maintained, becomes excessively crooked, taking the form of a substantially sinusoidal path. This is greatly avoided by the action of my stabilizer, which keeps the lateral forces of the unsprung mass of the vehicle to a very low maximum.

In Figs. 9 and 10, I show my stabilizer in connection with a motor vehicle. In this embodiment of the invention, my stabilizer is preferably mounted between the rear axle and the frame upon which the body is mounted, and like parts of my invention are designated by like reference characters. Although I have preferably illustrated my stabilizer as being mounted between the rear axle and the frame, I do not intend to limit the scope of my invention to this showing, because, as a modification, my stabilizer may be mounted between the front axle and the frame. In the preferred showing of this embodiment of the invention, the flat springs 40 and 41 are suitably connected to the axle and the spaced spring members 42 and 43 are connected to a rear cross-member 80 of the frame. As hereinbefore explained with reference to the rail vehicle, my stabilizer in effect, changes the four-point suspension of a motor vehicle to a three-point suspension. Hence, the riding comfort and the traction between the rear wheels and the road surface are greatly improved. This is because my stabilizer forces the entire body of the motor vehicle to travel in a plane that is substantially parallel to the plane of the travel of the rear axle, with the result that the jolts received by the front axle, caused by uneven places in the road surface, tend only to raise the front end of the body, devoid of any "rolling" action, as the plane of travel of the body is governed solely by plane of travel of the rear axle. In actual practice, the action of the entire body suspension is comparable to that of a three-wheeled motor vehicle, in that the plane of travel of the body is determined by the two-point suspension in the rear end and in that the single-point suspension in the front of the three-wheeled motor vehicle tends only to raise the front end of the body.

It is a well known fact that a three-wheeled motor vehicle takes the irregularities of the road surface with less jolting than a four-wheeled motor vehicle. For this reason, my invention improves the riding comfort of a four-wheeled motor vehicle. Furthermore, the jolts received by the front axle are readily damped, without transmitting any noticeable jolts to the body, for the reason that the jolts of the front axle must raise the entire front end of the body and not merely "roll" or oscillate the body, as it would do in the absence of my stabilizer. This, in effect, as regards damping the jolts received by the front axle, makes the front end of the body heavier. The fact that the plane of travel of the body is governed by the plane of travel of the rear axle makes it practicable to suspend or mount the front end of the body upon a single spring centrally positioned on the front axle, or upon the two springs spaced much closer together than they are on existing motor vehicles. This change would give greater freedom to the front axle and thus materially reduce the number of jolts transmitted to the body.

With respect to the rear axle, my stabilizer improves the traction between the tires and the road surface. In other words, the objectionable bouncing and spinning of the rear wheels are practically eliminated, because the excess energy that causes the bouncing and spinning of the rear wheels is transmitted through my stabilizer to the entire body where the energy is readily dissipated in controlling the action and plane of travel of the body.

My stabilizer is particularly adaptable to motor vehicles having strong and sturdy X-frames, such as the one illustrated in Fig. 9. This means that the front end of the body is held stable against any "rolling" as well as the rear end.

In Fig. 6, I show a modified stabilizing spring comprising a single flat leaf spring extending throughout its entire length and a plurality of short leaf springs secured on opposite sides thereof to give it rigidity in a vertical plane and positioned a suitable distance from the center to give the desired flexibility of the central portion when mounted on a vehicle. As is apparent, this modified form of stabilizing spring may be employed on vehicles of all types, and the desired rigidity and flexibility may be suitably varied by changing the size, number, and position of the several short leaf springs.

Since certain changes in my invention may be made without departing from the spirit and scope thereof, it is intended that all matters contained in the foregoing description and shown in the accompanying drawings shall be interpreted as illustrative and not in a limiting sense.

I claim as my invention:

1. A stabilizer for a vehicle having a sprung and an unsprung mass comprising, in combination, resilient connective means carried by both the sprung and the unsprung masses, and a stabilizing member interconnecting the said connective means for resisting the relative "rolling" movements of the sprung and the unsprung masses of the vehicle.

2. A stabilizer for a vehicle having a sprung and an unsprung mass comprising, in combination, means including two substantially rigid parts having their inner ends connected together in such manner that the two parts may move, and assume various angles, with respect to each other, resilient means for connecting the outer ends of the two parts to one of the said masses, and means for connecting an intermediate portion of the two parts to the other mass of the vehicle.

3. A stabilizer for a vehicle having a sprung and an unsprung mass comprising, in combination, means including two substantially rigid parts having a spring member flexibly interconnecting one set of their ends for resisting the relative "rolling" movements of the sprung and the unsprung masses of the vehicle, means for connecting the other set of the ends of the two parts to one of the said masses, and two spaced resilient means for connecting the spring member to the other mass of the vehicle.

4. A stabilizer for a vehicle having a sprung and an unsprung mass comprising, in combination, stabilizing means including two substantially rigid parts having a spring member flexibly interconnecting one set of their ends for resisting the relative "rolling" movements of the sprung and unsprung masses of the vehicle, connective means carried by one of the masses for engaging the other set of ends of the two parts, and two resilient spaced connective means carried by the other mass for engaging the spring member at places near where it is connected to the ends of the two rigid parts.

5. A stabilizer for a vehicle having a sprung and an unsprung mass comprising, in combination, stabilizing means including two substantially rigid parts having their inner ends connected together for resisting the relative "rolling" movements of the sprung and unsprung masses of the vehicle, resilient means carried by one of the masses for engaging the outer ends of the two parts, and two spaced resilient means carried by the other mass for engaging an intermediate portion of the two parts.

6. A stabilizer for a vehicle having a sprung and an unsprung mass comprising, in combination, a stabilizing member having its central portion flat-wise and its outer portions edge-wise, means for connecting the outer ends of the edge-wise portions to one of the masses, and means for connecting the inner ends of the edge-wise portions to the other mass of the vehicle.

7. A stabilizer for resisting the relative "rolling" movements of the sprung and the unsprung masses of a vehicle, comprising, in combination, a member having its central portion flat-wise and its outer portions edge-wise, resilient means for connecting the outer ends of the edge-wise portions to one of the masses, and resilient means for connecting the inner ends of the edge-wise portions to the other mass of the vehicle.

8. In a vehicle having a sprung and an unsprung mass, in combination, a stabilizing member having its central portion flexible in one plane and its outer portion flexible in another plane, means for connecting the outer ends of the stabilizing member to one of the masses, and means for connecting the intermediate portion of the stabilizing member to the other mass of the vehicle.

9. In a vehicle having a sprung and an unsprung mass, in combination, a stabilizing member having a plurality of assembled leaf springs with a flexible central portion, means for connecting the outer portion of the stabilizing member to one of the masses, and two spaced resilient means for connecting an intermediate portion of the stabilizing member to the other mass of the vehicle.

10. The combination with a vehicle having a truck and a mass pivotally mounted thereon, so that, when the vehicle is moving around a curve, the truck assumes various pivotal turning positions with respect to the mass, of a resilient stabilizing member interconnecting the truck and the mass for resisting the pivotal turning of the truck relative to the mass.

11. A stabilizer for a vehicle having a sprung and an unsprung mass comprising, in combination, stabilizing means for resisting the relative "rolling" movements of the said masses, resilient connective means for connecting the stabilizing means between the two masses, and means for causing the stabilizing means to be inoperative to resist the relative vertical movements of the two masses.

12. The combination with a vehicle having a rail sprung and an unsprung mass, in which the sprung mass is supported upon the unsprung mass by a spring equalization system, which, in the case of an uneven track, distributes equally the weight of the unsprung mass upon the wheels, of connective means mounted upon the sprung and unsprung masses, stabilizing means interconnecting the said connective means for resisting the relative "rolling" movements of the said masses, and means for causing the stabilizing means to be inoperative to resist the relative vertical movements of the two masses, and thus allow the free action of the spring equalization system.

13. The combination with a vehicle having a plurality of axles upon which is mounted a mass by means of a spring equalization system of side members for interconnecting the axles, and a stabilizing member interconnecting the side members and the mass for resisting the relative "rolling" movements of the mass and the axles.

14. A stabilizing member for a vehicle in which the sprung mass is supported upon the unsprung mass by means of a resilient connection, said stabilizing member having its central portion flexible in one plane and its outer portion flexible in another plane.

15. The combination with a system having two relatively movable parts connected together by means of a resilient connection, of a stabilizing member having its central portion flexible in one plane and its outer portions flexible in another plane, and means for connecting the said stabilizing member to the two relatively movable parts.

16. In a rail vehicle having a sprung mass supported upon an unsprung mass by means of supporting springs in which there is energy available to sustain the lateral oscillations of the unsprung mass when the vehicle is running above its "critical" speed, in combination, connective means carried by both the sprung and the unsprung masses of the vehicle, and stabilizing means interconnecting the connective means for constraining the sprung mass, upon the compressing and the expanding of the supporting springs, to move substantially parallel to the unsprung mass, thereby minimizing the energy that is available to sustain the lateral oscillations of the unsprung mass.

17. In a rail vehicle having a truck and a body pivotally mounted thereon, so that, when the vehicle is moving on a curved track, the truck assumes various pivotal turning positions with respect to the body, in combination, connective means carried by both the truck and the body, and stabilizing means for interconnecting the said connective means, the combination of the connective means and the stabilizing means being such that the truck, when the vehicle is moving on a curved track, may assume various pivotal turning positions with respect to the body.

18. A stabilizer for a vehicle having a sprung and an unsprung mass comprising, in combination, means including two substantially rigid parts having a resilient member interconnecting one set of their ends for resisting the relative "rolling" movements of the sprung and the unsprung masses of the vehicle, means for connecting the other set of the ends of the two parts to one of the said masses, and two spaced resilient means for connecting the resilient member to the other mass of the vehicle, the two spaced resilient means being disposed to engage the resilient member at places near where it is connected to the ends of the two substantially rigid parts.

19. A stabilizer for a vehicle having a sprung and an unsprung mass comprising, in combination, means including two substantially rigid parts having a resilient member interconnecting one set of their ends for resisting the relative "rolling" movements of the sprung and the unsprung masses, the region near the places at which the resilient member is connected to the one set of ends of the two substantially rigid parts being an engaging portion, two spaced resilient means for connecting the engaging portion to one of the masses, and means for connecting the other set of the ends of the two parts to the other mass of the vehicle.

20. A stabilizer for a vehicle having in combination, stabilizing means including two substantially rigid parts connected together by a resilient member, two spaced resilient means for connecting the stabilizing means to the sprung mass, and means for connecting the other ends of the two rigid parts to the unsprung mass.

21. A stabilizer for a vehicle having an axle and a frame resiliently supported thereon comprising, in combination, means including two substantially rigid parts having a resilient member interconnecting one set of their ends for resisting the relative "rolling" movements of the axle and the frame, the region near the places at which the resilient member is connected to the one set of ends of the two substantially rigid parts being an engaging portion, two spaced resilient means for connecting the engaging portion to the frame, and means for connecting the other set of the ends of the two parts to the axle.

22. A stabilizer for a vehicle having a sprung and an unsprung mass comprising, in combination, stabilizing means including two leaf springs connected together, two spaced connective means each including a resilient means for connecting two portions of the stabilizing means to one of the masses of the vehicle, and a second pair of spaced connective means for connecting two other portions of the stabilizing means to the other mass of the vehicle.

23. A stabilizer for a vehicle having a sprung and an unsprung mass comprising, in combination, means including two substantially rigid parts having a resilient member interconnecting one set of their ends for resisting the relative "rolling" movements of the sprung and the unsprung masses, the region near the places at which the resilient member is connected to the one set of ends of the two substantially rigid parts being an engaging portion, two spaced means each including a resilient means for connecting the engaging portion to one of the masses, and means for connecting the other set of the ends of the two parts to the other mass of the vehicle.

24. A stabilizer for a vehicle having a sprung and an unsprung mass comprising, in combination, stabilizing means including two substantially rigid parts connected together, two spaced connective means each including a resilient means for connecting two portions of the stabilizing means to one of the masses, and a second pair of spaced connective means for connecting two other portions of the stabilizing means to the other mass of the vehicle.

25. A stabilizer for a vehicle having a sprung and an unsprung mass comprising, in combination, stabilizing means including two substantially rigid parts connected together, two spaced connective means each including a resilient means for connecting two portions of the stabilizing means to one of the masses, and a second pair of spaced connective means, each including a resilient means for connecting two other portions of the stabilizing means to the other mass of the vehicle.

26. In a rail vehicle in which the sprung mass is supported upon the unsprung mass by a spring equalization system so that in the case of uneven track the weight of the rail vehicle is substantially equally distributed upon the wheels and in which there is energy available to sustain the lateral oscillations of the unsprung mass when the vehicle is running above its "critical" speed, in combination, connective means carried by both the sprung and unsprung masses of the vehicle, and means interconnecting the connective means for resisting the relative "rolling" movement of the said masses, thereby minimizing the energy that is available to sustain the lateral oscillations of the unsprung mass and at the same time allowing the substantially free action of the spring equalization system.

27. In a rail vehicle in which the sprung mass is supported upon the unsprung mass by a spring equalization system so that in the case of uneven track the weight of the rail vehicle is substantially equally distributed upon the wheel and in which there is energy available to sustain the lateral oscillations of the unsprung mass when the vehicle is running above its "critical" speed, in combination, stabilizing means including two substantially rigid parts connected together, two spaced means for connecting the stabilizing means to the sprung mass, and two spaced means for connecting the stabilizing means to the unsprung mass, the arrangement of the stabilizing means and the connective means being such that the said combination resists the relative "rolling" movement of the said masses, thereby minimizing the energy that is available to sustain the lateral oscillation of the unsprung mass and at the same time allowing the substantially free action of the spring equalization system.

28. In a rail vehicle in which the sprung mass is supported upon the unsprung mass by a spring equalization system so that in the case of uneven track the weight of the rail vehicle is substantially equally distributed upon the wheels and in which there is energy available to sustain the lateral oscillations of the unsprung mass when the vehicle is running above its "critical" speed, in combination, connective means carried by both the sprung and unsprung masses of the vehicle, and a stabilizing member interconnecting the connective means for resisting the relative "rolling" movement of the said masses, thereby minimizing the energy that is available to sustain the lateral oscillations of the unsprung mass and at the same time allowing the substantially free action of the spring equalization system.

29. In a vehicle having a sprung and an unsprung mass whereby the sprung mass is supported on the unsprung mass by an unstable or flexible combination of resilient means and associated lever arms adapted in such manner that the combined movement of the said resilient means and the said associated lever arms allows one or more of the wheels to move up-and-down relative to the sprung mass so that the vehicle by reason of the flexibility or instability of the combination of the resilient means and the associated lever arms may pass over irregularities in the road surface without communicating materially such up-and-down movements, caused by the irregularities in the road surface, to the sprung mass, in combination, stabilizing means having two substantially rigid parts connected together by a spring member, two spaced connective means for respectively connecting the end portions of the two substantially rigid parts to one of the masses and two spaced connective means for respectively connecting two other spaced portions of the stabilizing means to the other mass of the vehicle, the arrangement of the stabilizing means and the connective means being such that the said arrangement stabilizes the sprung mass upon the unsprung mass and thus constrains the sprung mass from "rolling" relative to the unsprung mass, which "rolling" would otherwise occur in the absence of the stabilizing means and the connective means because of the relative instability or flexibility of the said combination of the resilient means and the associated lever arms, which allows one or more of the wheels to move up-and-down relative to the sprung mass when the vehicle is passing over irregularities in the road surface.

30. In a vehicle having an unsprung mass and a sprung mass pivotally mounted thereon, so that, when the vehicle encounters a curve or a deviated path the unsprung mass assumes various pivotal turning positions with respect to the sprung mass, in combination, connective means carried by both the sprung mass and the unsprung mass, and stabilizing means including two portions connected together for interconnecting the said connective means, the combination of the connective means and the stabilizing means being such that the unsprung mass, when the vehicle encounters a curve or a deviated path, may assume various pivotal turning positions with respect to the sprung mass.

31. In a vehicle having an unsprung mass and a sprung mass pivotally mounted thereon, so that, when the vehicle encounters a curve or a deviated path the unsprung mass assumes various pivotal turning positions with respect to the sprung mass, in combination, connective means carried by both the sprung mass and the unsprung mass, and stabilizing means including two portions connected together by a resilient member for interconnecting the said connective means, the combination of the connective means and the stabilizing means being such that the unsprung mass, when the vehicle encounters a curve or a deviated path, may assume various pivotal turning positions with respect to the sprung mass.

32. In a vehicle having an unsprung mass and a sprung mass pivotally mounted thereon, so that, when the vehicle encounters a curve or a deviated path the unsprung mass assumes various pivotal turning positions with respect to the sprung mass, in combination, two spaced connective means carried by the unsprung mass, two spaced connective means carried by the sprung mass, and stabilizing means including two portions connected together for interconnecting the said connective means, the combination of the connective means and the stabilizing means being such that the unsprung mass, when the vehicle encounters a curve or a deviated path, may assume various pivotal turning positions with respect to the sprung mass.

33. In a vehicle having an unsprung mass and a sprung mass pivotally mounted thereon, so that, when the vehicle encounters a curve or a deviated path the unsprung mass assumes various pivotal turning positions with respect to the sprung mass, in combination, connective means carried by both the sprung mass and the unsprung mass, and stabilizing means including a resilient member which extends transversely of the vehicle, for interconnecting the said connective means, the combination of the connective means and the stabilizing means being such that the unsprung mass, when the vehicle encounters a curve or a deviated path, may assume various pivotal turning positions with respect to the sprung mass.

34. In a vehicle having an unsprung mass and a sprung mass pivotally mounted thereon, which, when the vehicle encounters a curve or a deviated path the unsprung mass assumes various pivotal turning positions with respect to the sprung mass, in combination, two spaced connective means carried by the unsprung mass, two spaced connective means carried by the sprung mass, stabilizing means including four portions connected together, means for respectively connecting two of said four portions to the two spaced connective means carried by the sprung mass, and means for respectively connecting the other two of said four portions to the two spaced connective means carried by the unsprung mass, the combination of the connective means and the stabilizing means being such that the unsprung mass, when the vehicle encounters a curve or a deviated path, may assume various pivotal turning positions with respect to the sprung mass.

35. The combination with a rail vehicle having a sprung mass and an unsprung mass, in which the sprung mass is supported upon the unsprung mass by a spring equalization system, which, in the case of an uneven track, distributes the weight of the vehicle upon the wheels, of connective means mounted upon the sprung and unsprung masses, and stabilizing means interconnecting the said connective means for resisting the relative "rolling" movements of the said masses, the combination of the connective means, the stabilizing means, and the spring equalization system, being such that the wheels may move up-and-down to accommodate an uneven track.

36. The combination with a rail vehicle having a sprung mass and an unsprung mass, in which the sprung mass is supported upon the unsprung mass by a spring equalization system, which, in the case of an uneven track, distributes the weight of the vehicle upon the wheels, of two spaced connective means carried by the unsprung mass, two spaced connective means carried by the sprung mass, and stabilizing means including two portions connected together for interconnecting the said connective means to resist the relative "rolling" movements of the said masses, the combination of the connective means, the stabilizing means, and the spring equalization system, being such that the wheels may move up-and-down to accommodate an uneven track.

37. The combination with a rail vehicle having a sprung mass and an unsprung mass, in which the sprung mass is supported upon the unsprung mass by a spring equalization system, which, in the case of an uneven track, distributes the weight of the vehicle upon the wheels, of two spaced connective means carried by the unsprung mass, two spaced connective means carried by the sprung mass, and stabilizing means including four portions connected together to resist the relative "rolling" movements of the said masses, means for respectively connecting two of said four portions to the two spaced connective means carried by the sprung mass, and means for respectively connecting the other two of said four portions to the two spaced connective means carried by the unsprung mass, the combination of the connective means, the stabilizing means, and the spring equalization system, being such that the wheels may move up-and-down to accommodate an uneven track.

38. The combination with a rail vehicle having a sprung mass and an unsprung mass, in which the sprung mass is supported upon the unsprung mass by a spring equalization system, which, in the case of an uneven track, distributes the weight of the vehicle upon the wheels, of connective means mounted upon the sprung and unsprung masses, and stabilizing means including a resilient member which extends transversely of the vehicle for interconnecting the said connective means to resist the relative "rolling" movements of the said masses, the combination of the connective means, the stabilizing means, and the spring equalization system, being such that the wheels may move up-and-down to accommodate an uneven track.

39. In a rail vehicle having a sprung mass supported upon an unsprung mass by means of supporting springs in which there is energy available to sustain the lateral oscillations of the unsprung mass when the vehicle is running above its "critical" speed, in combination, connective means carried by both the sprung and the unsprung masses of the vehicle, and stabilizing means including two portions connected together for interconnecting the connective means and for constraining the sprung mass, upon the compressing and the expanding of the supporting springs, to move substantially parallel to the unsprung mass, thereby minimizing the energy that is available to sustain the lateral oscillations of the unsprung mass.

40. In a rail vehicle having a sprung mass supported upon an unsprung mass by means of supporting springs in which there is energy available to sustain the lateral oscillations of the unsprung mass when the vehicle is running above its "critical" speed, in combination, two spaced connective means carried by the unsprung mass, two spaced connective means carried by the sprung mass, and stabilizing means including four portions connected together, means for respectively connecting two of said four portions to the two spaced connective means carried by the sprung mass, and means for respectively connecting the other two of said four portions to the two spaced connective means carried by the unsprung mass, the combination of the connective means and the stabilizing means being such that it resists the relative "rolling" movements of the said masses, thereby minimizing the energy that is available to sustain the lateral oscillations of the unsprung mass.

41. In a rail vehicle having a sprung mass supported upon an unsprung mass by means of supporting springs in which there is energy available to sustain the lateral oscillations of the unsprung mass when the vehicle is running above its "critical" speed, in combination, connective means carried by both the sprung and the unsprung masses of the vehicle, and stabilizing means including a resilient member which extends transversely of the vehicle for interconnecting the connective means and for constraining the sprung mass, upon the compressing and the expanding of the supporting springs, to move substantially parallel to the unsprung mass, thereby minimizing the energy that is available to sustain the lateral oscillations of the unsprung mass.

42. A stabilizer for a system having two relatively movable parts comprising, in combination, a continuous leaf spring extending throughout the length of the stabilizer and arranged to have a relatively flexible central portion, two spaced connecting means for connecting two spaced portions of the stabilizer to one of said parts, and two other spaced connecting means for connecting two other spaced portions of the stabilizer to the other part.

43. In a vehicle having a sprung mass pivotally mounted upon an unsprung mass, so that, when the vehicle encounters a curve or a deviated path, the unsprung mass assumes various pivotal turning positions with respect to the sprung mass, in combination, connective means carried by both the sprung and unsprung mass, and resilient stabilizing means for interconnecting the said connective means, the combination of the connective means and the resilient stabilizing means being such that the combination resists the pivotal turning of the unsprung mass relative to the sprung mass.

44. A stabilizer for a system having two relatively movable masses comprising, in combination, two spaced connective means carried by one of the masses, two spaced connective means carried by the other mass, and stabilizing means, for interconnecting the said spaced connective means, said stabilizing means including two outer portions which move relative to each other and a central portion connected therebetween, said central portion being constructed of a continuous resilient member and being adapted to bend or bow so that the two outer portions may move relative to each other, as the said masses move relative to each other.

45. In a stabilizer to constrain the relative "rolling" movements of two relatively movable masses of a system, in combination, stabilizing means mounted transversely of the system and having two outer portions which move relative to each other and a distortable central portion rigidly connected therebetween, said distortable central portion being resilient and having its ends spaced apart transversely of the system, and adapted to be subjected to stress as the two outer portions move relative to each other.

46. In a stabilizer to constrain the relative "rolling" movements of two relatively movable masses of a system, in combination, stabilizing means mounted transversely of the system and having two outer portions and a central portion rigidly connected therebetween, said central portion being resilient and having its ends spaced apart transversely of the system, and adapted to be subjected to stress as the two outer portions move relative to each other, the said stabilizing means having a bend at or near the place where each end of the central portion is connected to the outer portions.

47. In a vehicle having a sprung and an unsprung mass whereby the sprung mass is supported on the unsprung mass by a combination of resilient means and associated lever arms adapted in such manner that the combined movement of the said resilient means and the said associated lever arms allows one or more of the wheels to move up-and-down relative to the sprung mass so that the wheels of the vehicle may pass over irregularities in the road surface, in combination, stabilizing means having two outer portions and a central portion connected therebetween, said central portion being constructed of resilient means and adapted to be subjected to stress as the two outer portions move relative to each other, and connective means for connecting the stabilizing means to the sprung and unsprung masses, the arrangement of the stabilizing means and the connective means being such that the said arrangement stabilizes the sprung mass upon the unsprung mass and thus constrains the sprung mass from "rolling" relative to the unsprung mass, which "rolling" would otherwise occur in the absence of the stabilizing means and the connective means because of the action of the said combination of the resilient means and the associated lever arms, which allows one or more of the wheels to move up-and-down relative to the sprung mass when the vehicle is passing over irregularities in the road surface.

48. In a vehicle having a sprung and an unsprung mass whereby the sprung mass is supported on the unsprung mass by a combination of resilient means and associated lever arms adapted in such manner that the combined movement of the said resilient means and the said associated lever arms allows one or more of the wheels to move up-and-down relative to the sprung mass so that the wheels of the vehicle may pass over irregularities in the road surface, in combination, stabilizing means having two outer portions and a central portion connected therebetween, said central portion being constructed of resilient means and adapted to be subjected to stress as the two outer portions move relative to each other, the said stabilizing means having a bend at or near the place where each end of the central portion is connected to the outer portions, and connective means for connecting the stabilizing means to the sprung and unsprung masses, the arrangement of the stabilizing means and the connective means being such that the said arrangement stabilizes the sprung mass upon the unsprung mass and thus constrains the sprung mass from "rolling" relative to the unsprung mass, which "rolling" would otherwise occur in the absence of the stabilizing means and the connective means because of the action of the said combination of the resilient means and the associated lever arms, which allows one or more of the wheels to move up-and-down relative to the sprung mass when the vehicle is passing over irregularities in the road surface.

49. In a vehicle having a sprung mass, a portion of which being supported upon an unsprung mass, and another portion of which being supported upon a plurality of unsprung masses, whereby one or more of the said plurality of unsprung masses is connected to the sprung mass by a combination of resilient means and associated lever arms adapted in such manner that the combined movement of the said resilient means and the said associated lever arms allows one or more of the wheels of the said plurality of unsprung masses to move up-and-down relative to the sprung mass so that the said wheels mounted on the plurality of unsprung masses may pass over irregularities in the road surface, in combination, connective means carried by the sprung mass, connective means carried by the first-mentioned unsprung mass, and stabilizing means including two portions connected together for interconnecting the said connective means, the arrangement of the stabilizing means and the connective means being such that the said arrangement stabilizes the sprung mass upon the said first-mentioned unsprung mass and thus constrains the sprung mass from "rolling" relative to the said first mentioned unsprung mass, which rolling would otherwise occur in the absence of the stabilizing means and the connective means because of the action of the said combination of the resilient means and the associated lever arms which allows one or more of the wheels of the said plurality of unsprung masses to move up-and-down relative to the sprung mass when the vehicle is passing over irregularities in the road surface.

50. In a vehicle having a sprung mass, a portion of which being supported upon an unsprung mass, and another portion of which being supported upon a plurality of unsprung masses, whereby one or more of the said plurality of unsprung masses is connected to the sprung mass by a combination of resilient means and associated lever arms, adapted in such manner that the combined movement of the said resilient means and the said associated lever arms allows one or more of the wheels of the said plurality of unsprung masses to move up-and-down relative to the sprung mass so that the said wheels mounted on the plurality of unsprung masses may pass over irregularities in the road surface, in combination, connective means carried by the sprung mass, connective means carried by the first-mentioned unsprung mass, and stabilizing means for interconnecting the said connective means, the arrangement of the stabilizing means and the connective means being such that the said arrangement stabilizes the sprung mass upon the said first-mentioned unsprung mass and thus constrains the sprung mass from "rolling" relative to the said first mentioned unsprung mass, which rolling would otherwise occur in the absence of the stabilizing means and the connective means because of the action of the said combination of the resilient means and the associated lever arms which allows one or more of the wheels of the said plurality of unsprung masses to move up-and-down relative to the sprung mass when the vehicle is passing over irregularities in the road surface.

GEORGE V. WOODLING